US007325397B2

(12) United States Patent
Lee

(10) Patent No.: US 7,325,397 B2
(45) Date of Patent: Feb. 5, 2008

(54) DEVICE FOR CONTINUOUSLY SUPPLYING COMPRESSED AIR FROM A PORTABLE CONTAINER TO A PNEUMATIC TOOL BY GREATLY REDUCING PRESSURE OF COMPRESSED AIR AND THEN PRECISELY ADJUSTING SAME

(76) Inventor: Chi ping Lee, 56, Lane 226, Taiming Road, Wurih, Taichung, Taiwan (TW)

( * ) Notice: Subject to any disclaimer, the term of this patent is extended or adjusted under 35 U.S.C. 154(b) by 0 days.

(21) Appl. No.: 11/750,905

(22) Filed: May 18, 2007

(65) Prior Publication Data

US 2007/0214781 A1 Sep. 20, 2007

Related U.S. Application Data

(63) Continuation of application No. 11/204,948, filed on Aug. 16, 2005, now abandoned.

(51) Int. Cl.
*F15B 13/02* (2006.01)
*F16K 31/12* (2006.01)

(52) U.S. Cl. ..................... 60/413; 91/446; 137/505.11; 137/505.42

(58) Field of Classification Search .................. 60/413; 91/446; 137/505.11, 505.42
See application file for complete search history.

(56) References Cited

U.S. PATENT DOCUMENTS

| | | | | |
|---|---|---|---|---|
| 3,547,143 | A * | 12/1970 | Mills, Jr. | 137/505.42 |
| 3,586,037 | A * | 6/1971 | Zimmer | 137/505.42 |
| 5,392,825 | A * | 2/1995 | Mims et al. | 137/505.42 |
| 5,407,096 | A * | 4/1995 | Smith | 222/1 |
| 6,161,573 | A * | 12/2000 | Sheng | 137/505.42 |
| 6,637,450 | B2 * | 10/2003 | Huang | 137/68.3 |
| 2005/0111995 | A1 * | 5/2005 | Everson | 417/313 |

* cited by examiner

*Primary Examiner*—Thomas E. Lazo

(57) ABSTRACT

A two stage pressure regulating device is disclosed. The device is adapted to supply compressed air from a portable container having a pressure of about 150 kg/cm$^2$ to a pneumatic tool by first greatly reducing pressure of compressed air in the container to about 13 kg/cm$^2$ through a pressure-reducing unit and then precisely adjusting same in a low pressure range of about 1-10 kg/cm$^2$ through a fine pressure adjustment unit which is in fluid communication with the pneumatic tool, whereby a user is able to continuously safely operate the pneumatic tool.

3 Claims, 8 Drawing Sheets

C ~ C'

DEVICE FOR CONTINUOUSLY SUPPLYING COMPRESSED AIR FROM A PORTABLE CONTAINER TO A PNEUMATIC TOOL BY GREATLY REDUCING PRESSURE OF COMPRESSED AIR AND THEN PRECISELY ADJUSTING SAME

This is a continuation of application Ser. No. 11/204,948, filed Aug. 16, 2005, now abandoned.

BACKGROUND OF THE INVENTION

1. Field of Invention

The invention relates to pneumatic tools and more particularly to an improved device for supplying compressed air from a portable container to a pneumatic tool (e.g., pneumatic nail gun, pneumatic screwdriver, pneumatic wrench, etc.) by first greatly reducing pressure of compressed air through a pressure-reducing unit and then precisely adjusting same through a fine pressure regulator, whereby a user can continuously operate the pneumatic tool in a safety manner.

2. Description of Related Art

The invention described later is an outgrowth of earlier work by the inventor hereof, described in U.S. Utility patent application Ser. No. 11/204,948, filed Aug. 16, 2005, the teachings of which are incorporated herein by reference.

The main problem of the Utility patent application is that it is not safe. This is because the portable container typically has a pressure of about 150 kg/cm$^2$ which is difficult of and also dangerous of adjusting to 1-10 kg/cm$^2$ for use by manually manipulating the pressure-reducing unit. Thus, the need for improvement still exists.

SUMMARY OF THE INVENTION

It is therefore one object of the invention to provide a two stage device for supplying compressed air from a portable container to a pneumatic tool by first greatly reducing pressure of compressed air in the container through a pressure-reducing unit and then precisely adjusting same in a low pressure range through a fine pressure adjustment unit which is in fluid communication with the pneumatic tool, whereby a user can continuously safely operate the pneumatic tool.

The above and other objects, features and advantages of the invention will become apparent from the following detailed description taken with the accompanying drawings.

DETAILED DESCRIPTION OF THE INVENTION

Figure 1:
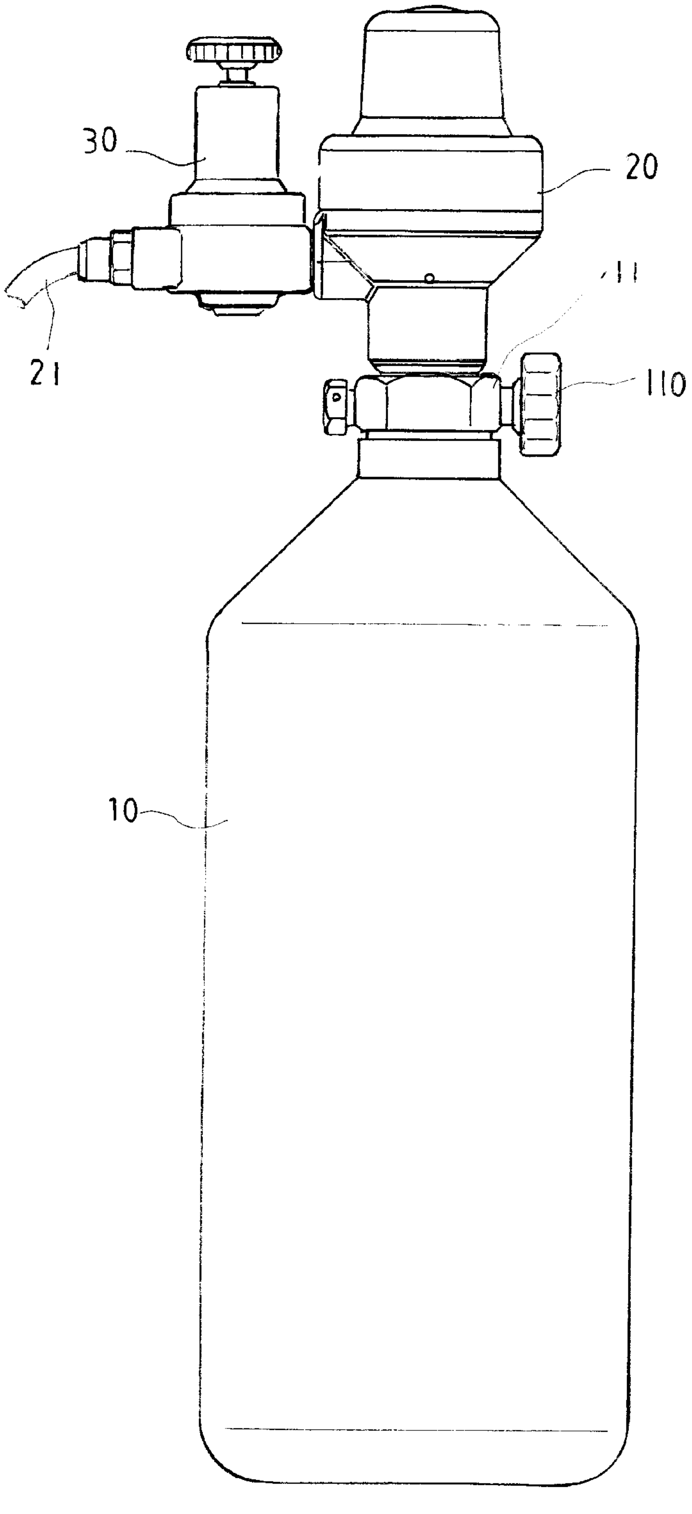
FIG. 1 is a side view of a compressed air supply device according to a first preferred embodiment of the invention.
Figure 2:
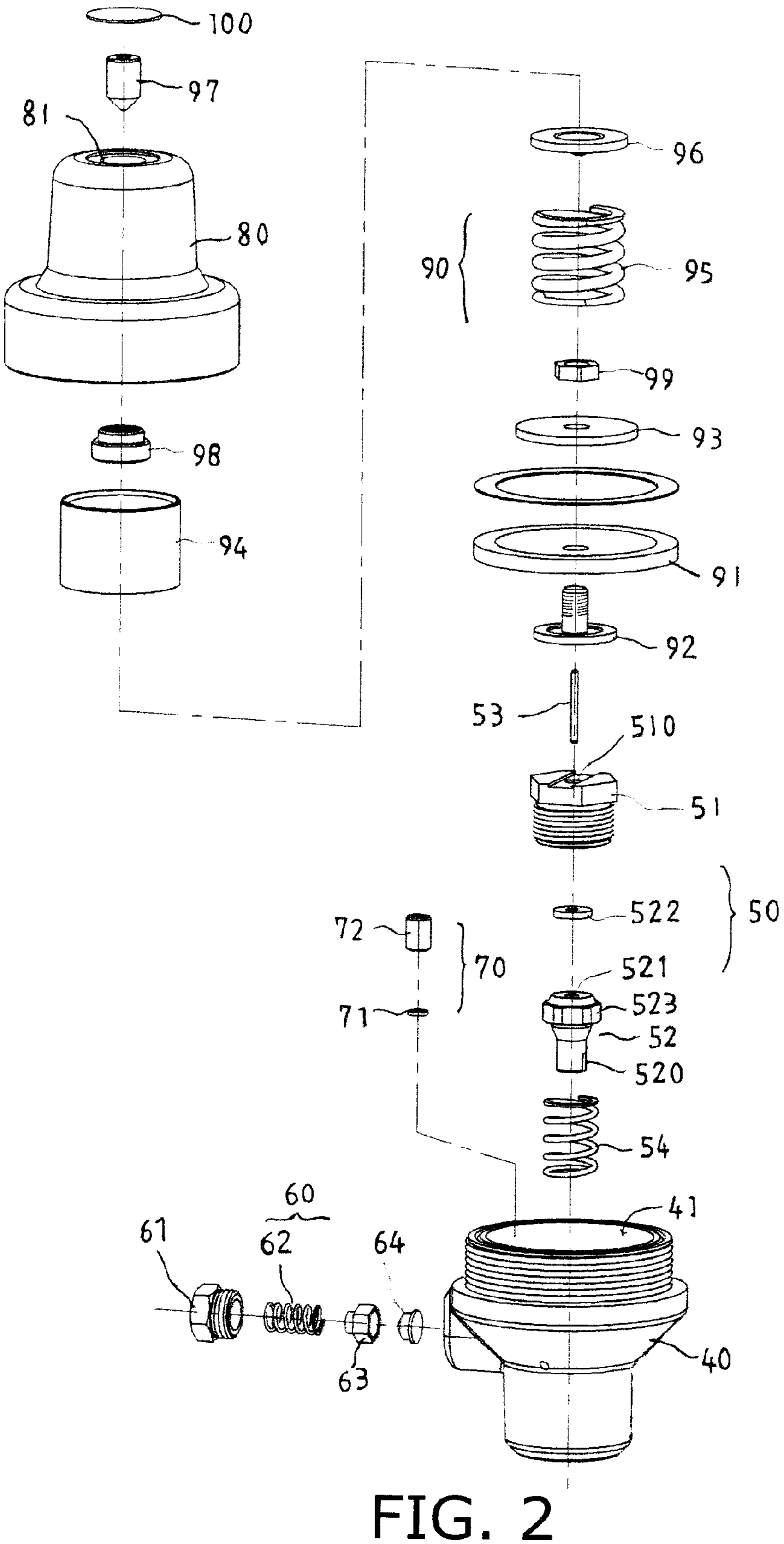
FIG. 2 is an exploded view of the pressure-reducing unit shown in FIG. 1.
Figure 3:
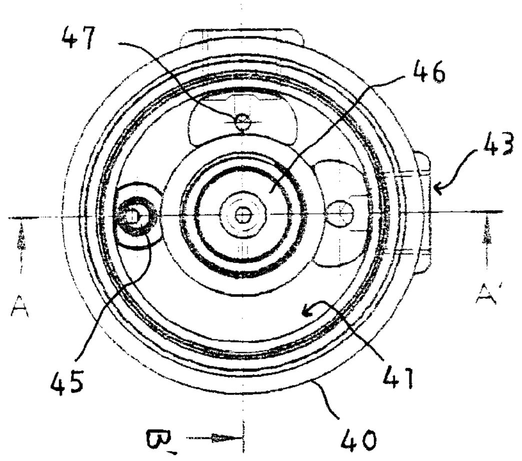
FIG. 3 is a top view of the pressure-reducing unit shown in FIG. 2.
Figure 4:
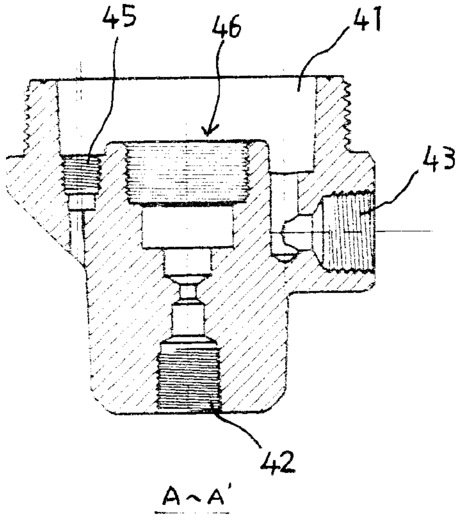
FIGS. 4 and 5 are sectional views taken along lines A-A' and B-B' in FIG. 3 respectively.
Figure 5:
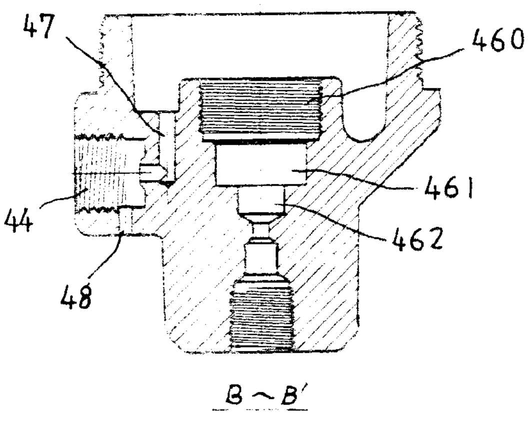
Figure 6:
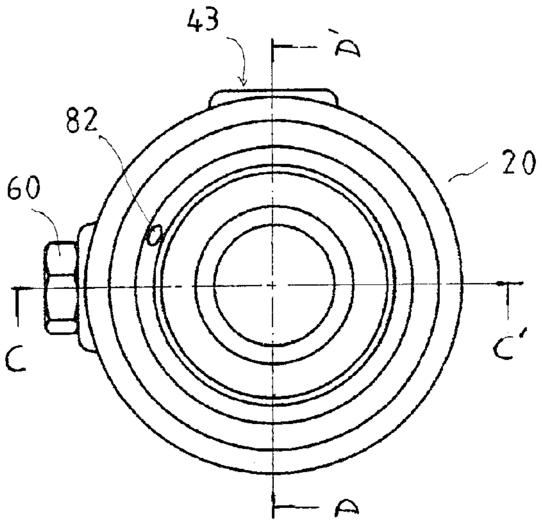
FIG. 6 is a top view of the pressure-reducing unit shown in FIG. 1.
Figure 7:
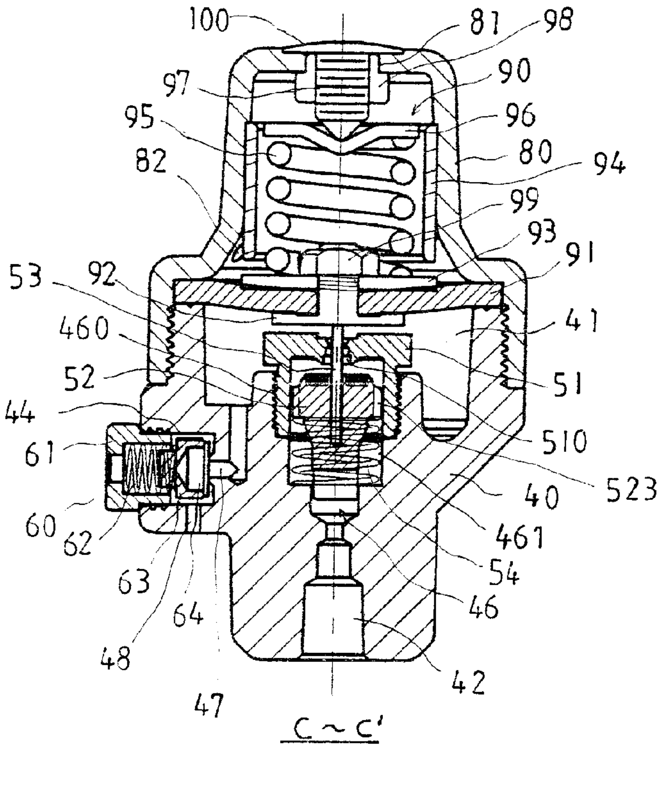
FIGS. 7 and 8 are sectional views taken along lines C-C' and D-D' in FIG. 6 respectively where compressed air is feeding into the pressure-reducing unit.
Figure 8:
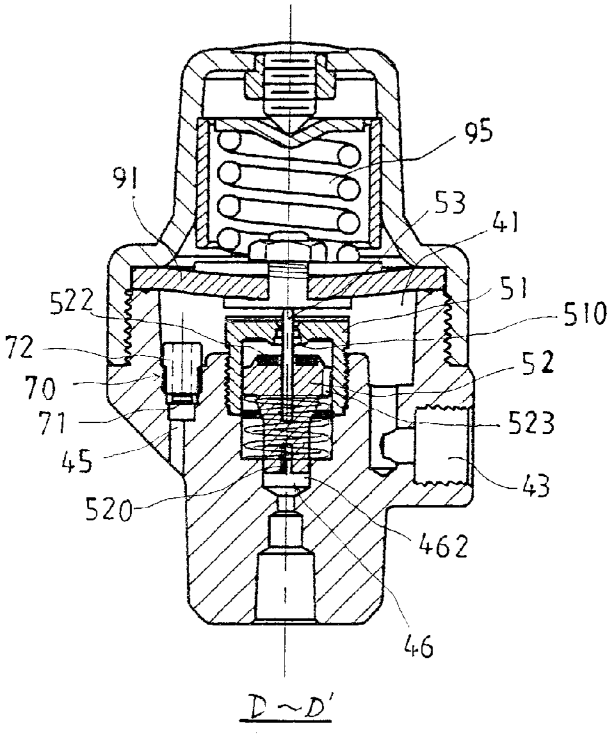
Figure 9:
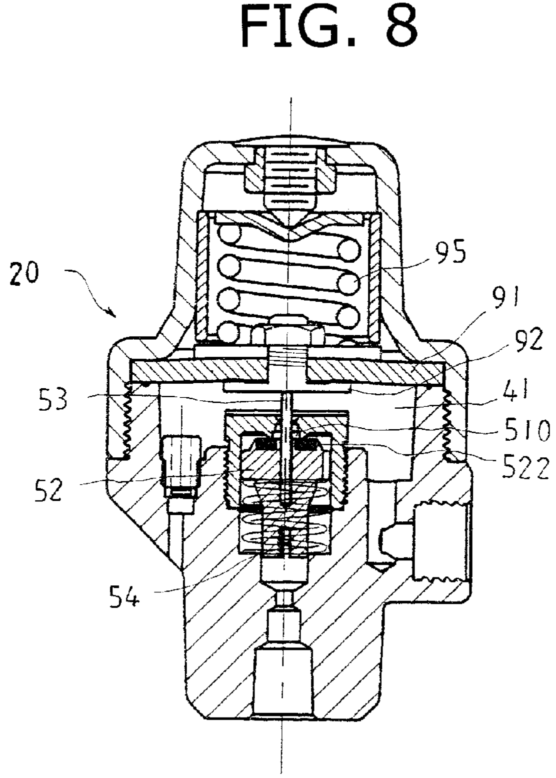
FIG. 9 is a view similar to FIG. 8 where compressed air feeding is stopped.
Figure 10:
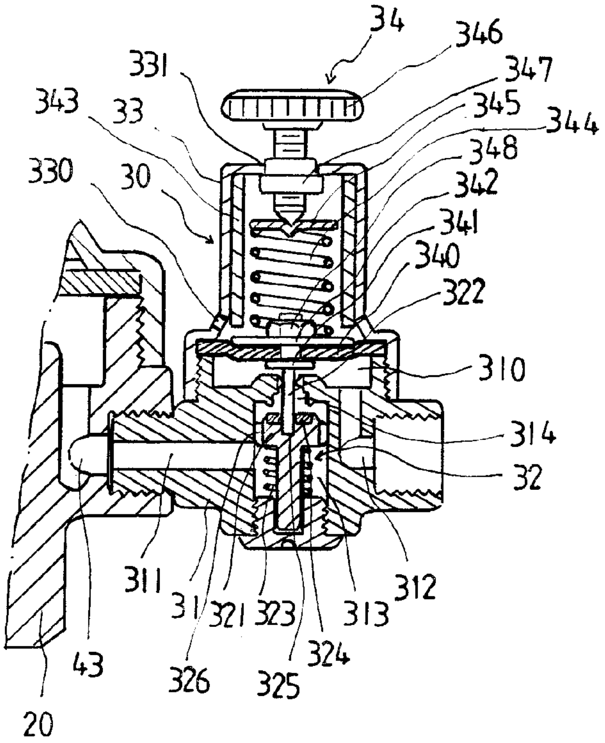
FIG. 10 is a longitudinal sectional view of the fine pressure adjustment unit shown in FIG. 1 where its valve is open.

Referring to FIGS. 1 to 11, a compressed air supply device in accordance with a first preferred embodiment of the invention is shown. The device is adapted to supply compressed air from a portable container 10 (e.g., an aluminum container V.06 W0.8 FP150 TP250 filled with liquid $CO_2$ having a pressure of about 150 kg/cm$^2$ and a weight of 600 g) to a pneumatic tool (e.g., pneumatic nail gun, pneumatic screwdriver, pneumatic wrench, or the like). The device comprises a pressure-reducing unit 20 on top of the container 10, and a fine pressure adjustment unit 30. Each component is discussed in detail below.

The pressure-reducing unit 20 comprises the following components. A tube-like body 40 including a pressure-reducing chamber 41 at one end, a compressed air inlet 42 at the other end in fluid communication with the pressure-reducing chamber 41, a compressed air outlet 43 through a peripheral surface, a relief hole 44 through the peripheral surface spaced from the air outlet 43, a relief channel 45 in the peripheral surface opposite the outlet 43, a staged channel 46 provided between the pressure-reducing chamber 41 and the inlet 42 and including, with width decreased from the pressure-reducing chamber 41 to the inlet 42, a threaded section 460, an intermediate section 461, and an innermost section 462.

A valve assembly 50 is provided in the channel 46 and comprises a threaded cup 51 threadedly secured to the threaded section 460 and including an axial through aperture 510; a plug 52 partially provided in the cup 51 and including a lower slot 520 provided in the innermost section 462, a top hole 521, a ring 522 sandwiched between the top hole 521 and the cup 51, and an intermediate peripheral passage 523; a pin 53 inserted through the hole 521 and the aperture 510 into the pressure-reducing chamber 41; and a coil spring 54 compressed between bottom of the intermediate section 461 and an intermediate shoulder of the channel 46 for biasing the plug 52 toward the aperture 510.

A relief valve 60 is provided in the relief hole 44 and is in fluid communication with the pressure-reducing chamber 41 through a relief passage 47. The relief valve 60 comprises a nut 61 threadedly secured to inner threads of the relief hole 44 for fastening the relief valve 60 in the relief hole 44, a staged sleeve 63, a piston 64 provided in the sleeve 63, and a coil spring 62 compressed between the nut 61 and the sleeve 63 for causing the piston 64 to close the relief passage 47 in an inoperative state. A relief hole 48 is formed through the relief hole 44 such that a fluid communication is established between an internal space of the relief hole 44 and the atmosphere.

A safety unit 70 is provided in the relief channel 45 and comprises a membrane 71 and a hollow bolt 72 having outer threads for fastening the safety unit 70 in the relief channel 45. Compressed air in the pressure-reducing chamber 41 having a pressure value lower than the set pressure value is prevented from leaving the pressure-reducing chamber 41. But when compressed air in the pressure-reducing chamber 41 builds up to a pressure value higher than the set pressure value the membrane 71 is deformed and damaged (i.e., the safety unit 70 is open) to release pressure therein through the relief channel 45.

A bell-shaped shroud 80 includes internal threads threadedly secured to the externally threaded extension of the pressure-reducing chamber 41, a top opening 81, and an orifice 82 in fluid communication between the internal space of the shroud 80 and the atmosphere. A pressure-reducing assembly 90 is provided in the shroud 80 and comprises a rubber ring 91 compressed between a top of the body 40 (i.e., on top of the pressure-reducing chamber 41) and an internal shoulder of the shroud 80 for separating air in the pressure-reducing chamber 41 from air in an upper portion of the shroud 80, a nut 98, a washer 93, a threaded bolt 92 through the ring 91 and the washer 93 to threadedly secure to the nut 98 at a top of the shroud 80 and urged upwardly by the pin 53, a cylinder 94 anchored in the upper portion of the shroud 80, a flexible ring-shaped seat 96 on top of the cylinder 94, a threaded cone 97 urged against a center of the seat 96 to form a dimple, and a coil spring 95 in the cylinder 94 compressed between the seat 96 and the washer 93. A cover 100 is provided on tops of the cone 97 and the nut 98 for concealing the top opening 81.

The fine pressure adjustment unit 30 comprises a housing 31 including an internal space 310, a chamber 313, an orifice 314 in communication with both the space 310 and the chamber 313, an inlet channel 311 in communication with the chamber 313 and the air outlet 43, and an air outlet 312 in communication with the space 310.

The fine pressure adjustment unit 30 further comprises a valve 32 in the chamber 313. The valve 32 comprises a T-shaped member 321 in the chamber 313, a rubber seal 324 seated on the head of the T-shaped member 321 facing the orifice 314, a hole 325 through the seal 324 and the head of the T-shaped member 321, a peripheral tunnel 326 formed between the head of the T-shaped member 321 and an inner wall of the chamber 313, a sliding rod 322 in the space 310 and inserted into the hole 325, and a spring 323 put on the shank of the T-shaped member 321 for pushing the T-shaped member 321 toward the orifice 314.

The fine pressure adjustment unit 30 further comprises a cylindrical casing 33 projecting upward from the housing 31 and threadedly secured thereto. The casing 33 comprises a relief hole 330 proximate a joining portion with the housing 31 and a top opening 331.

The fine pressure adjustment unit 30 further comprises a pressure adjusting section 34 including a rubber diaphragm 340 in the space 310 and having its periphery secured to an internal shoulder at a joining portion of the casing 33 and the housing 31, a disc 341 secured between the sliding rod 322 and a center hole of the diaphragm 340, a washer 342 seated on the center hole of the diaphragm 340 opposite the disc 341, a bolt and nut combination 348 driven through the washer 342 and center hole of the diaphragm 340 into the disc 341 for fastening them together such that air in the space 310 is prevented from entering the casing 33, a sleeve 343 tightly engaged with an inner surface of the casing 33, an external hand wheel 346 having a threaded shank mounted through the top opening 331 of the casing 33 by cooperating with a nut 347 under the top opening 331 for opening or closing the fine pressure adjustment unit 30, a spring 344 in the sleeve 343 having a bottom end secured to the bolt and nut combination 348, and a disc-shaped seat 347 mounted on a top end of the spring 344 and having a center dimple (not numbered) engaged with a sharp end of the shank of the hand wheel 346.

Figure 12:
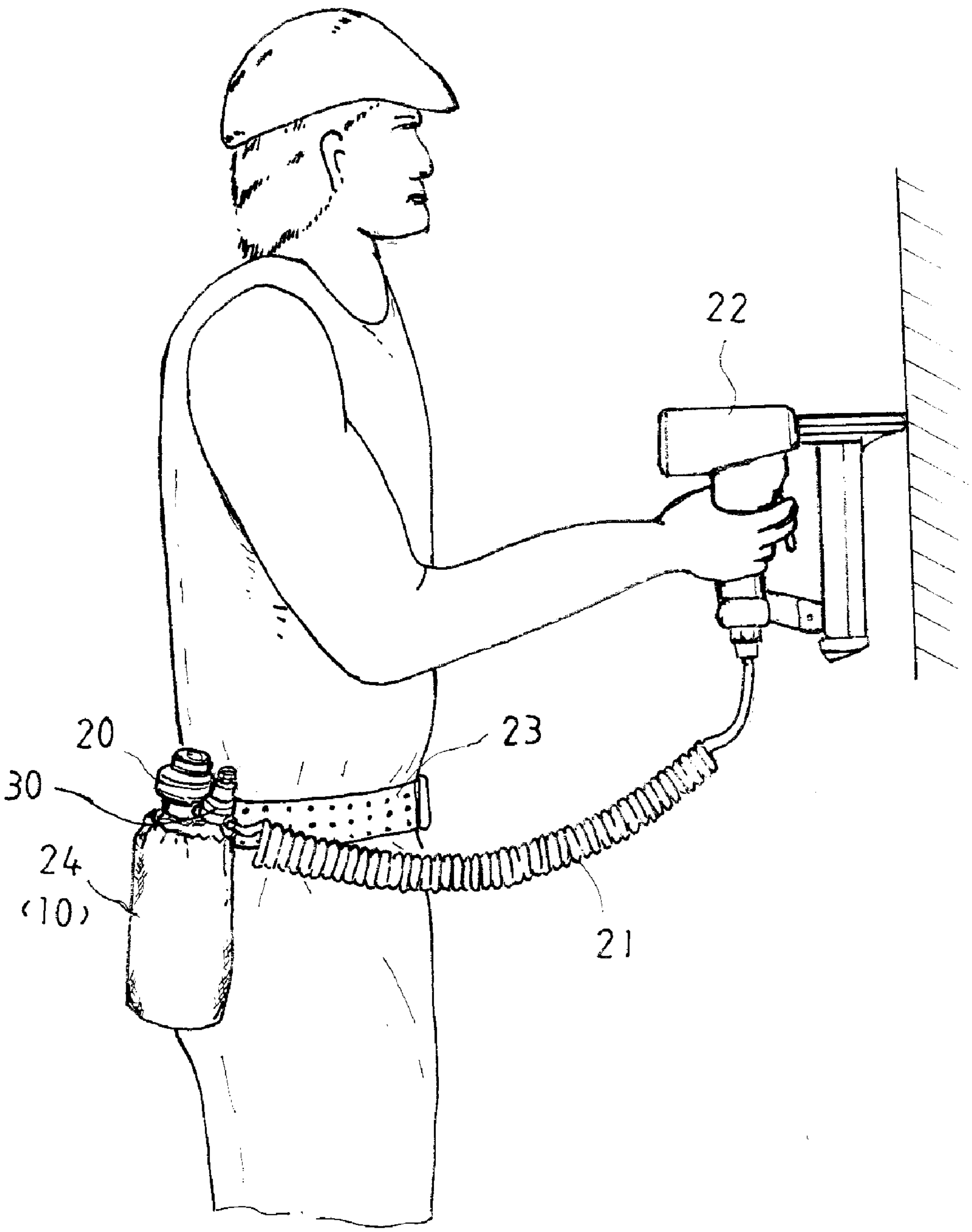
FIG. 12 is an environmental view of the pneumatic tool (e.g., pneumatic nail gun) being operated by a worker.

Referring to FIG. 12, in use a worker may wear the fine pressure adjustment unit 30, the pressure-reducing unit 20 and the container 10 on his belt with the container 10 enclosed in a bag 24. The pneumatic tool (e.g., pneumatic nail gun) 22 is connected to the fine pressure adjustment unit 30 via the coil-shaped outlet hose 21.

A first stage of pressure adjusting operation will be explained by referring to FIGS. 1 to 12. Compressed air stored in the container 10 passes the inlet 42, the channel 46, the slot 520, the passage 523, and the aperture 510 into the pressure-reducing chamber 41 prior to entering the fine pressure adjustment unit 30 as the ring 522 disengages the aperture 510 by opening a valve 110 at a joining portion of the container 10 and the pressure-reducing unit 20. Next, the ring 91 is flattened by moving the pin 53 upward to urge against bottom of the bolt 92. Thus, the bolt 92 moves upward toward the spring 95. The plug 52 then moves toward the aperture 510 as air pressure in the pressure-reducing chamber 41 builds up to close the aperture 510 by engaging the ring 522 therewith. As a result, compressed air input path is closed. Air pressure in the pressure-reducing chamber 41 remains at this level (e.g., pressure of about 13 $kg/cm^2$ after dropping from pressure of about 150 $kg/cm^2$ in the container 10).

The provision of the fine pressure adjustment unit 30 aims at facilitating adjusting output pressure of the device to be in the range of 1 $kg/cm^2$ to 10 $kg/cm^2$ which is the desired operating pressure of a pneumatic tool (e.g., pneumatic nail gun, pneumatic screwdriver, pneumatic wrench, or the like). Also, as described in the background section it is difficult and dangerous of directly reducing pressure from about 150 $kg/cm^2$ to 1-10 $kg/cm^2$ for operation by manually manipulating the pressure-reducing unit 20.

Air pressure in the pressure-reducing chamber 41 decreases from about 13 $kg/cm^2$ to about 1 $kg/cm^2$ as the pneumatic tool 22 operates as detailed later. Thus, the ring 91 flexibly deforms again to push both the bolt 92 and the pin 53 downward. The plug 92 moves downward due to the downward movement of the pin 53. As such, compressed air enters the pressure-reducing chamber 41 through the aperture 510 for building up pressure therein. The aperture 510 then closes when air pressure at both sides thereof are balanced with air pressure in the pressure-reducing chamber 41 reaching a set value. As a result, the pneumatic tool 22 is capable of operating again.

Compression of the spring 95 can be adjusted by removing the cover 100 prior to adjusting the cone 97 with respect to the nut 98. Pressure in the pressure-reducing chamber 41 can be thus adjusted. The relief valve 60 is adapted to open when pressure in the pressure-reducing chamber 41 exceeds a set opening pressure of the relief valve 60 due to malfunction or other reasons. In the process of opening the relief valve 60, the sleeve 63 slides in response to the pressure in the pressure-reducing chamber 41 (e.g., in the range of about 15 $kg/cm^2$ to 18 $kg/cm^2$). The spring 62 is thus compressed to disengage the piston 64 with the relief passage 47. As a result, the relief passage 4 is open and compressed air in the pressure-reducing chamber 41 leaves the relief passage 47 after passing the relief hole 48 and the relief valve 60. Another safety arrangement is the provision of the safety unit 70 in which the membrane 71 can be broken in response to abnormal pressure level (e.g., in the range of about 20 $kg/cm^2$ to 25 $kg/cm^2$) in the pressure-reducing chamber 41. Compressed air may leave the pressure-reducing chamber 41 after passing the membrane 71 and the relief channel 45.

Figure 11:
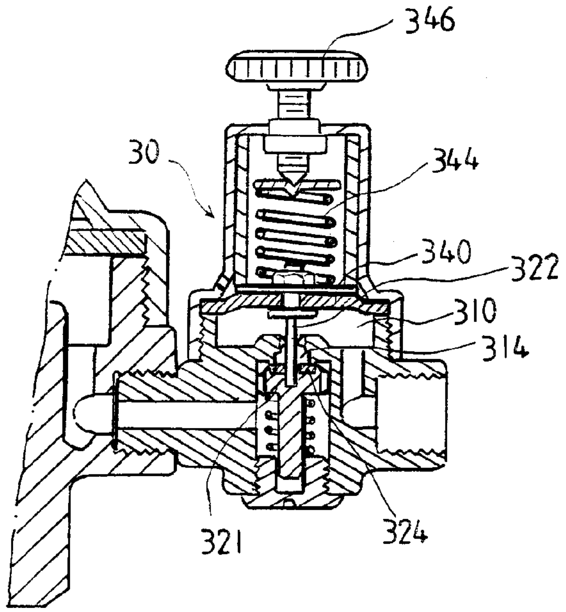
FIG. 11 is a view similar to FIG. 10 where the valve is closed.

A second stage of pressure adjusting operation as the subject of the invention will be explained now. Compressed air having a pressure of about 13 kg/cm$^2$ is fed to the chamber 313 through the air outlet 43 and the inlet channel 311. In a normal state, the orifice 314 is closed by the seal 324 and pressure in the chamber 313 maintains at a level in a range of 10 to 13 kg/cm$^2$ with the sleeve 343 engaging the washer 342 as shown in FIG. 11. Next, a user may, for example, clockwise turn the hand wheel 346 to compress the spring 344 which in turn pushes down the diaphragm 340 by pressing the washer 342. As such, the diaphragm 340 flexibly deforms by projecting downward from a position shown in FIG. 11 to a position shown in FIG. 10. And in turn, the sliding rod 322 moves down to disengage the seal 324 with the orifice 314. As a result, compressed air in the chamber 313 flows to the air outlet 312 through the tunnel 326, the orifice 314, and the space 310. Eventually, compressed air flows from the air outlet 312 to the pneumatic tool 22.

Note that pressure of the compressed air fed to the pneumatic tool 22 can be adjusted by turning the hand wheel 346. It is designed that compressed air having a pressure in the range of 1 kg/cm$^2$ to 10 kg/cm$^2$ is desired for effectively, safely operating the pneumatic tool 22. Also, upward deforming of the diaphragm 340 will be stopped when the washer 342 engages with a bottom end of the sleeve 343 in the process of turning the hand wheel 346.

Following data is obtained after conducting a sufficient number of experiments with respect to nail hammering. One gram of liquid $CO_2$ is consumed in one operation of the pneumatic nail gun 22 in which the nail is 27 mm long, pressure in the container 10 is about 150 kg/cm$^2$, and a nail hammering is done by the pneumatic nail gun 22 having a pressure about 5-7 kg/cm$^2$. Thus, about 600 times of operation of the pneumatic nail gun 22 can be expected for the container 10 fully containing pressurized liquid $CO_2$. Note that capacity of the container 10 can be changed depending on applications. Also, only a short period of time about less than 2 second (i.e., quick) is required between two consecutive operations (i.e., nail hammering). Thus, the pneumatic nail gun 22 can operate quickly. Further, a number of pressure levels are printed on the cover 100 for user selection prior to pressure adjustment. Note that a pressure gauge (not shown) may be provided at either end of the outlet hose 21. Thus, a user may be aware of pressure in the pressure-reducing chamber 41 in order to determine whether it is normal or not. Moreover, another pressure gauge (not shown) may be provided at the air outlet 312. Thus, a user may visually observe pressure of compressed air supplied to the pneumatic tool 22 in operation. This facilitates a precise pressure adjustment of the device.

Figure 13:
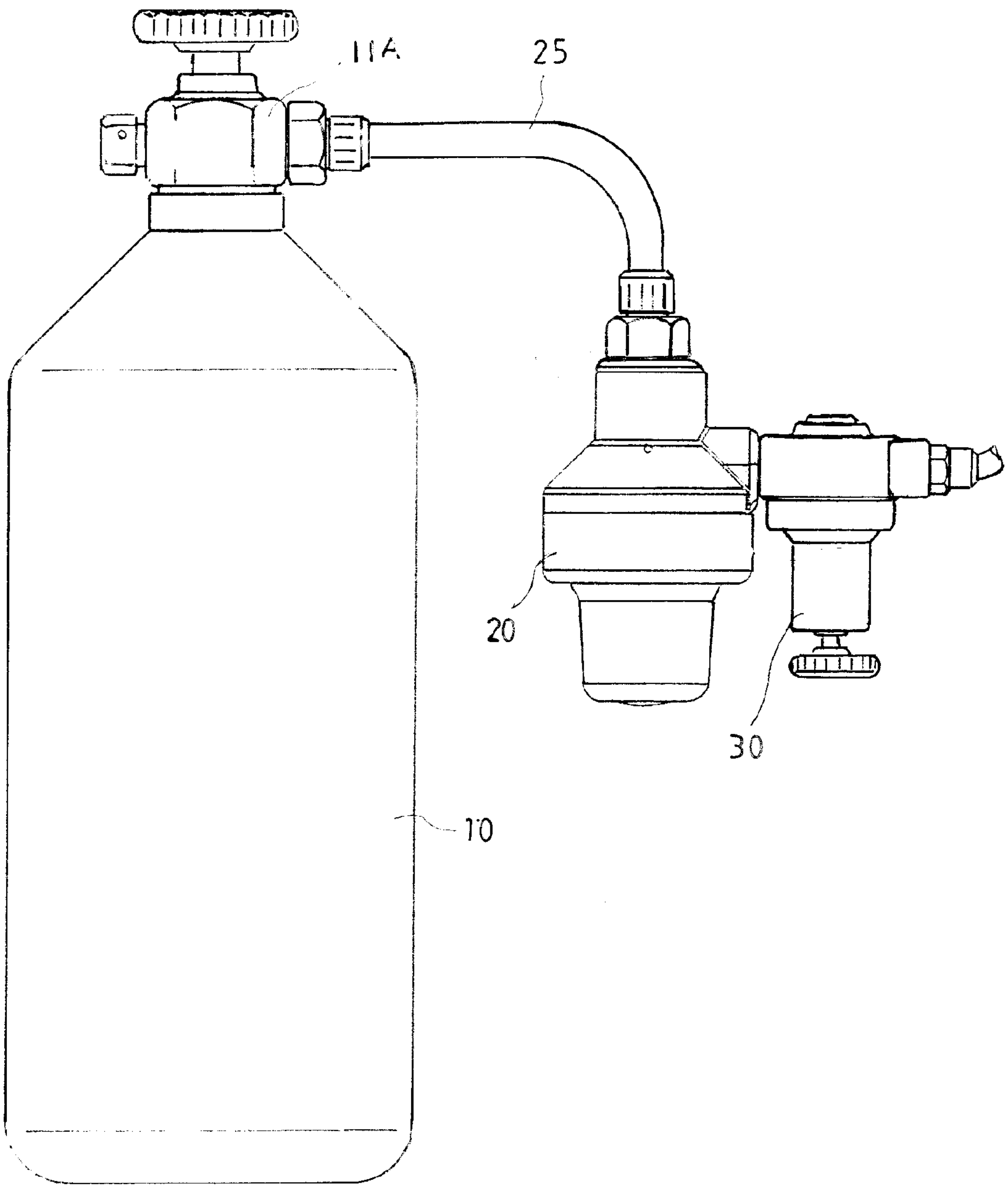
FIG. 13 is a side view of a compressed air supply device according to a second preferred embodiment of the invention.

Referring to FIG. 13, a compressed air supply device in accordance with a second preferred embodiment of the invention is shown in which a short hose 25 is interconnected a valve 11A and a pressure-reducing unit 20. This embodiment aims at permitting a user to place the pressure-reducing unit 20 in another bag for facilitating operation.

While the invention herein disclosed has been described by means of specific embodiments, numerous modifications and variations could be made thereto by those skilled in the art without departing from the scope and spirit of the invention set forth in the claims.

What is claimed is:

1. A device having one end connected to a valve (110) of a portable container (10) filled with compressed air and the other end connected to a pneumatic tool (22) via a hose (21), comprising:

a tube-like body (40) including a pressure-reducing chamber (41) at one end, an air inlet (42) at the other end in fluid communication with both the pressure-reducing chamber (41) and the valve (110), an air outlet (43) through a peripheral surface, a relief hole (44) through the peripheral surface, a relief channel (45) at the peripheral surface opposite the air outlet (43), a staged channel (46) between the pressure-reducing chamber (41) and the air inlet (43) and including a threaded section (460), an intermediate section (461), and an innermost section (462), and a relief passage (47);

a valve assembly (50) in the staged channel (46) and including a threaded cup (51) secured to the threaded section (460) and including an axial through aperture (510); a plug (52) partially disposed in the cup (51) and including a lower slot (520) in the innermost section (462), a top hole (521), a first ring (522) sandwiched between the top hole (521) and the cup (51), and an intermediate peripheral passage (523); a pin (53) inserted through the top hole (521) and the aperture (510) into the pressure-reducing chamber (41); and a first spring (54) compressed between a bottom of the intermediate section (461) and an intermediate shoulder of the staged channel (46) for biasing the plug (52) toward the aperture (510);

a relief valve (60) in the relief hole (44) and being in fluid communication with the pressure-reducing chamber (41) through the relief passage (47);

a safety valve (70) in the relief channel (45);

a shroud (80) threadedly secured to the pressure-reducing chamber (41) and including a top opening (81), and an orifice (82) in fluid communication between inside of the shroud (80) and the atmosphere;

a pressure-reducing assembly (90) in the shroud (80) and including a flexible second ring (91) compressed between a top of the body (40) and an internal shoulder of the shroud (80) for separating air in the pressure-reducing chamber (41) from air in an upper portion of the shroud (80), secured at a top of the shroud (80), and urged upwardly by the pin (53), a cylinder (94) anchored in the upper portion of the shroud (80), a flexible ring-shaped seat (96) on a top of the cylinder (94), a threaded cone (97) urged against a center of the seat (96), a second spring (95) in the cylinder (94) compressed between the seat (96) and the second ring (91), and a threaded fastener (92) through the second ring (91) to secure to at a top of the shroud (80) and urged upwardly by the pin (53); and a fine pressure adjustment unit (30) including a first chamber (310), a second chamber (313), an orifice (314) interconnecting the first and the second chambers (310, 313), an inlet channel (311) in communication with the second chamber (313) and the air outlet (43), an air outlet (312) in communication with the first chamber (310), a valve (32) in the second chamber (313) and including a spring-loaded T-shaped member (321) in the second chamber (313), a rubber seal (324) seated on the head of the T-shaped member (321) and closing the orifice (314), a peripheral tunnel (326) between the head of the T-shaped member (321) and the second chamber (313), a T-shaped sliding rod (322) in the first chamber (310) and secured to the T-shaped member (321), and a pressure adjusting section (34) including a diaphragm (340) fastened in the first chamber (310), and secured to the sliding rod (322), a threaded hand wheel (346), a third spring (344) having a bottom end secured to the diaphragm (340), and a seat (347) mounted on a top end of the third spring (344) and secured to a sharp end of the hand wheel (346);

wherein in response to opening the valve (110) and disengaging the first ring (522) with the aperture (510) compressed air in the container (10) passes the air inlet (42), the staged channel (46), the slot (520), the passage (523), the aperture (510), the pressure-reducing chamber (41), the air outlet (43), and the inlet channel (311) to flow to the second chamber (313) by decreasing pressure of compressed air to a first predetermined pressure value, the second ring (91) is flattened by moving the pin (53) upward to move the fastener (92) toward the second spring (95) and move the plug (52) toward the aperture (510);

wherein the aperture (510) is closed when air pressure at both sides thereof are balanced;

wherein in response to turning the hand wheel (346) in a first direction the third spring (344) compresses to push down and flexibly deform the diaphragm (340) and move the sliding rod (322) down to open the orifice (314) by disengaging the seal (324) with the orifice (314), thereby enabling compressed air in the second chamber (313) to reach the pneumatic tool (22) in a second predetermined pressure value lower than the first predetermined pressure value through the tunnel (326), the orifice (314), the first chamber (310), and the air outlet (312); and wherein air pressure in the pressure-reducing chamber (41) is decreased to a value below the first predetermined pressure value in response to operating the pneumatic tool (22) the second ring (91) flexibly deforms to push the pin (53) and the plug (52) downward for permitting compressed air to enter the pressure-reducing chamber (41) through the aperture (510) for building up pressure therein until pressure in the pressure-reducing chamber (41) reaches the first predetermined pressure value.

2. The device of claim 1, wherein the first predetermined pressure value is about 13 $kg/cm^2$.

3. The device of claim 1, wherein the second predetermined pressure value is in a range of about 1 $kg/cm^2$ to about 10 $kg/cm^2$.

* * * * *